US009565532B2

(12) United States Patent
Wilson et al.

(10) Patent No.: US 9,565,532 B2
(45) Date of Patent: Feb. 7, 2017

(54) SYSTEM FOR PROVIDING LOCATION-BASED SERVICES IN A WIRELESS NETWORK, SUCH AS LOCATING SETS OF DESIRED LOCATIONS

(71) Applicant: KNAPP INVESTMENT COMPANY LIMITED, Tortola (VG)

(72) Inventors: Brian Wilson, Redmond, WA (US); Jacob Feinstein, Seattle, WA (US); Mike Suraci, Kenmore, WA (US); Kristian Simsarian, San Francisco, CA (US); Duane Bray, San Francisco, CA (US); Roshi Givechi, San Francisco, CA (US); Rajat Paharia, Fremont, CA (US); Laura Weiss, San Francisco, CA (US); Marcus Gosling, San Francisco, CA (US)

(73) Assignee: KNAPP INVESTMENT COMPANY LIMITED, Tortola (VG)

( * ) Notice: Subject to any disclaimer, the term of this patent is extended or adjusted under 35 U.S.C. 154(b) by 0 days.

(21) Appl. No.: 14/291,221

(22) Filed: May 30, 2014

(65) Prior Publication Data
US 2014/0274156 A1 Sep. 18, 2014

Related U.S. Application Data

(63) Continuation of application No. 13/690,704, filed on Nov. 30, 2012, now Pat. No. 8,774,834, which is a (Continued)

(51) Int. Cl.
*H04W 4/02* (2009.01)
*H04W 64/00* (2009.01)
(Continued)

(52) U.S. Cl.
CPC .............. *H04W 4/025* (2013.01); *H04L 67/04* (2013.01); *H04L 67/16* (2013.01); *H04W 4/02* (2013.01); *H04W 64/00* (2013.01); *H04W 80/00* (2013.01)

(58) Field of Classification Search
CPC ........ H04W 4/02; H04W 64/00; H04W 80/00; H04W 4/025
(Continued)

(56) References Cited

U.S. PATENT DOCUMENTS 5,930,699 A 7/1999 Bhatia
5,948,040 A 9/1999 DeLorme et al.
(Continued)

FOREIGN PATENT DOCUMENTS

DE 4326900 2/1995
WO WO 98/82379 11/1998
(Continued)

OTHER PUBLICATIONS

Childi, Jr., "Qualcomm Turns Cell Phones into GPS Systems: PCWorld.com", www.pcworld.com/resource/printable/article/0,80085,00.asp., accessed Mar. 19, 2002 Jan. 16, 2002; 1 page.
(Continued)

*Primary Examiner* — Sam Bhattacharya
(74) *Attorney, Agent, or Firm* — Anova Law Group, PLLC

(57) ABSTRACT

A system and associated method receives a command from a user's mobile device to locate points of interest near the mobile device's location. The points of interest are associated with different, user-identified, point of interest categories. Based at least in part on the mobile device's location, the system substantially simultaneously provides a list of points of interest for at least some of the point of interest categories.

20 Claims, 14 Drawing Sheets

Related U.S. Application Data continuation of application No. 13/181,740, filed on Jul. 13, 2011, now Pat. No. 8,412,236, which is a continuation of application No. 12/835,950, filed on Jul. 14, 2010, now Pat. No. 8,010,132, which is a continuation of application No. 12/420,466, filed on Apr. 8, 2009, now Pat. No. 7,783,306, which is a continuation of application No. 10/984,618, filed on Nov. 8, 2004, now Pat. No. 7,532,899.

(60) Provisional application No. 60/562,785, filed on Apr. 15, 2004.

(51) Int. Cl.
*H04L 29/08* (2006.01)
*H04W 80/00* (2009.01)

(58) Field of Classification Search
USPC .............. 455/404.2, 418–420, 456.1–456.3
See application file for complete search history.

(56) References Cited

U.S. PATENT DOCUMENTS

| | | |
|---|---|---|
| 6,047,327 A | 4/2000 | Tso et al. |
| 6,049,711 A | 4/2000 | Ben-Yehezkel et al. |
| 6,104,316 A | 8/2000 | Behr et al. |
| 6,138,003 A | 10/2000 | Kingdon et al. |
| 6,212,392 B1 | 4/2001 | Fitch et al. |
| 6,321,092 B1 | 11/2001 | Fitch et al. |
| 6,321,158 B1 | 11/2001 | DeLorme et al. |
| 6,332,127 B1 | 12/2001 | Bandera et al. |
| 6,347,278 B2 | 2/2002 | Ito |
| 6,360,102 B1 | 3/2002 | Havinis et al. |
| 6,381,535 B1 | 4/2002 | Durocher et al. |
| 6,397,057 B1 | 5/2002 | Malackowski et al. |
| 6,401,034 B1 | 6/2002 | Kaplan et al. |
| 6,441,752 B1 | 8/2002 | Fomukong |
| 6,442,391 B1 | 8/2002 | Johansson et al. |
| 6,484,148 B1 | 11/2002 | Boyd |
| 6,505,048 B1 | 1/2003 | Moles et al. |
| 6,549,768 B1 | 4/2003 | Fraccaroli |
| 6,587,691 B1 | 7/2003 | Granstam et al. |
| 6,647,269 B2 | 11/2003 | Hendrey et al. |
| 6,654,800 B1 | 11/2003 | Rieger |
| 6,662,014 B1 | 12/2003 | Walsh |
| 6,748,306 B2 | 6/2004 | Lipowicz |
| 6,757,544 B2 | 6/2004 | Rangarajan et al. |
| 6,801,763 B2 | 10/2004 | Elsey et al. |
| 6,810,323 B1 | 10/2004 | Bullock et al. |
| 6,819,919 B1 | 11/2004 | Tanaka |
| 6,839,628 B1 | 1/2005 | Tu |
| 6,865,480 B2 | 3/2005 | Wong |
| 6,889,054 B2 | 5/2005 | Himmel et al. |
| 6,968,179 B1 | 11/2005 | De Vries |
| 6,983,203 B1 | 1/2006 | Wako |
| 7,023,502 B2 | 4/2006 | Zhang et al. |
| 7,024,205 B1 | 4/2006 | Hose |
| 7,071,842 B1 | 7/2006 | Brady, Jr. |
| 7,082,365 B2 | 7/2006 | Sheha et al. |
| 7,155,339 B2 | 12/2006 | Tu |
| 7,203,502 B2 | 4/2007 | Wilson et al. |
| 7,277,733 B2 | 10/2007 | Ko et al. |
| 7,388,519 B1 | 6/2008 | Kreft |
| 7,532,899 B2 | 5/2009 | Wilson et al. |
| 7,783,306 B2 | 8/2010 | Wilson et al. |
| 7,849,135 B2 | 12/2010 | Agrawal et al. |
| 8,010,132 B2 | 8/2011 | Wilson et al. |
| 8,412,236 B2 | 4/2013 | Wilson et al. |
| 2001/0029174 A1 | 10/2001 | Herajarvi et al. |
| 2002/0022488 A1 | 2/2002 | Srinivasan et al. |
| 2002/0038234 A1 | 3/2002 | Fu et al. |
| 2002/0047787 A1 | 4/2002 | Mikkola et al. |
| 2002/0049533 A1 | 4/2002 | Kusano et al. |
| 2002/0086683 A1 | 7/2002 | Kohar et al. |
| 2002/0102989 A1 | 8/2002 | Calvert et al. |
| 2002/0120697 A1 | 8/2002 | Generous et al. |
| 2002/0138196 A1 | 9/2002 | Polidi et al. |
| 2002/0160766 A1 | 10/2002 | Portman et al. |
| 2003/0013456 A1 | 1/2003 | Bates et al. |
| 2003/0026432 A1 | 2/2003 | Woodward |
| 2003/0036848 A1 | 2/2003 | Sheha et al. |
| 2003/0040340 A1 | 2/2003 | Smethers |
| 2003/0055983 A1 | 3/2003 | Callegari |
| 2003/0066031 A1 | 4/2003 | Laane |
| 2003/0100326 A1 | 5/2003 | Grube et al. |
| 2003/0109266 A1 | 6/2003 | Rafiah et al. |
| 2003/0186680 A1 | 10/2003 | Bhasin et al. |
| 2003/0220835 A1 | 11/2003 | Barnes, Jr. |
| 2004/0023666 A1 | 2/2004 | Moon et al. |
| 2004/0039781 A1 | 2/2004 | LaVallee et al. |
| 2004/0087326 A1 | 5/2004 | Dunko et al. |
| 2004/0103024 A1 | 5/2004 | Patel et al. |
| 2004/0133339 A1* | 7/2004 | Braun-Huon ..... G06F 17/30241 |
| 2004/0138943 A1 | 7/2004 | Silvernali |
| 2004/0143667 A1 | 7/2004 | Jerome |
| 2004/0186883 A1 | 9/2004 | Numan et al. |
| 2004/0193691 A1 | 9/2004 | Chang |
| 2004/0260465 A1 | 12/2004 | Tu |
| 2005/0107949 A1 | 5/2005 | Yokota |
| 2005/0160001 A1 | 7/2005 | Lapre et al. |
| 2012/0009946 A1 | 1/2012 | Wilson et al. |

FOREIGN PATENT DOCUMENTS

| | | |
|---|---|---|
| WO | WO 00/22860 | 4/2000 |
| WO | WO 02/25986 | 3/2002 |

OTHER PUBLICATIONS

CNN.com/Technology, "Metal Detector Finds lost Coins in Kids", Jan. 29, 2003, 3 pages.

Cosmiverse Staff Writer, "GPS Cell Phone Tracking used on Errant Lovers", Paranormal News, Sep. 11, 2001, www.comiverse.com/paranormal109110101.html, accessed Mar. 19, 2002, 2 pages.

Freeze, "Sams Teach Yourself Microsoft Internet Explorer 5 in 24 Hours", Sams Publishing, 1999, pp. 21, 101-103, 214-220.

GEOEurope, "Location Based Services heading in the Right Direction?", GEOPlace.com; www.geoplace.com/ge/2001/0101/0101lbs.asp, Copyright 2001, Adams Business Media, accessed Jun. 1, 2002, 4 pages.

Heltzl, "Track Friends by Phone; NetworkWorldFusion News", Feb. 3, 2000, www.nwfusion.com/news/2000/0203phonetrack.html, accessed Mar. 19, 2002, 3 pages.

Iniru, "About Us", InirU Israel, www.iriru.com/company/about.html, accessed Jun. 11, 2002, 1 page.

Iniru, "M-Commerce", InirU Israel, www.iriru.com/company/about.html, accessed Jun. 11, 2002, 1 page.

Iniru, "P2P Services", InirU Israel, www.iriru.com/company/about.html, accessed Jun. 11, 2002, 1 page.

Iniru, "Technology", Iniru Israel, www.iriru.com/company/about.html, accessed Jun. 11, 2002, 1 page.

Inirui, "InirU Application Developers Program", Iniru Israel, www.iriru.com/company/about.html, accessed Jun. 11, 2002, 2 pages.

L.I.F. Location Inter-Operability Forum, "Oh No! Now my Friends are Stalking Me!", LIF Post Conference Workshop, Date Not Available, 1 page.

SignalSoftWireles Location Services, "Location Manager", www.signalsoftcorp.com, Copyright 2000, accessed Jun. 11, 2002, 2 pages.

SignalSoftWireless Location Services, "Friend Finder", www.signalsoftcorp.com, Copyright 2000, accessed Jun. 11, 2002, 2 pages.

SignalSoftWireless Location Services, "In Location", www.signalsoftcorp.com, Copyright 2000, accessed Jun. 11, 2002, 2 pages.

SignalSoftWireless Location Services, "Location Studio", wvvw.signalsoftcorp.com, Copyright 2000, accessed Jun. 11, 2002.

(56) References Cited

OTHER PUBLICATIONS

SignalSoftWireless Location Services, "Safety First", www.signalsoftcorp.com, Copyright 2000, accessed Jun. 11, 2002.
Valis Ltd., "Valis is the First Multi Channel Company in the Cellular Arena", Valis the Multichannel Company, www.valis,co/il, Copyright 2002, Valis Ltd., Accessed Jun. 11, 2002, 1 page.
Webraska, IbDN Tracking Overview, Webraska Mobile Technologies, www.webraska.com/template/php?1=0&o=products&r=ibdn.sub.--trac, Copyright 2002, accessed Jun. 11, 2002, 1 page.
Webraska, "Applications", Webraska Mobile Technologies, www.webraska.it/index.php, Copyright 2002, accessed Mar. 19, 2002, 1 page.
Webraska, "IbDN Fleet Overview", Webraska Mobile Technologies, www.webraska.com/template/php?1=0&o=products&r-ibdn.sub.--flee, Copyright 2002, accessed Jun. 11, 2002, 1 page.
Webraska, "IbDN SDK Overview", Webraska Mobile Technologies, www.webraska.com/template.php?1=0&o=products&r=ibdn.sub.--sdk, Copyright 2002, accessed Jun. 11, 2002, 1 page.
Webraska, "SmartSMS Applications Overview", Webraska Mobile Technologies, www.webraska.com/template.php?1=0$o=products&r=smar.sub.--appl, Copyright 2002, accessed Jun. 11, 2002, 1 page.
Webraska, "SmartZone Application Overview", Webraska Mobile Technologies, www.webraska.com/template.php?1=0&o=products&r=smar.sub.--appl, Copyright 2002, accessed Jun. 11, 2002, 1 page.
Webraska, "SmartZone Applications Platform Overview", Webraska Mobile Technologies, www.webraska.com/template.php?1=0&o=products&r=smar.sub--app.sub.--plat, Copyright 2002, accessed Jun. 11, 2002, 1 page.
Webraska, "SmartZone DataSets Overview", Webraska Mobile Technologies, www.webraska.com/template.php?1=0&o=products&r=smar.sub.--data, Copyright 2002, accessed Jun. 11, 2002, 1 page.
Webraska, "SmartZone GeoSpatial Platform Overview", Webraska Mobile Technologies, www.webraska,com/template.php?1=0&o=products&r=smar.sub.--geos.sub.--plat-, Copyright 2002, accessed Jun. 11, 2002, 1 page.
Webraska, "SmartZone Telematics Platform Overview", Webraska Mobile Technologies, www.webraska.com/template.php?1=0&o=products&r=smar.sub/--telm.--plat-, pyright 2002, accessed Jun. 11, 2002, 1 page.
Webraska, "Telecommunications Products Overview", Webraska Mobile Technologies, www.webraska.com/template.php?1=0&o=products&r=tele.sub.--prod.sub--over-, Copyright 2002, accessed Jun. 11, 2002, 2 pages.
Webraska, "Telematics Products Overview", Webraska Mobile Technologies, www.webraska.com/template.php?1=0&o=products&r=telm.sub.--prod.sub--over, Copyright 2002, accessed Jun. 11, 2002, 1 page.

* cited by examiner

| User's POI Sets | | 1300 |
|---|---|---|
| Set 1 | [Alphanumeric] | |
| Set 2 | [Alphanumeric] | |
| Set 3 | [Alphanumeric] | |
| Set 4 | [Alphanumeric] | |
| Set 5 | [Alphanumeric] | |

*FIG. 13*

| POI Set 1 Categories | | 1400 |
|---|---|---|
| Category 1 | [POI Category x] | |
| Category 2 | [POI Category x] | |
| Category 3 | [POI Category x] | |
| Category 4 | [POI Category x] | |
| Category 5 | [POI Category x] | |

*FIG. 14*

SYSTEM FOR PROVIDING LOCATION-BASED SERVICES IN A WIRELESS NETWORK, SUCH AS LOCATING SETS OF DESIRED LOCATIONS

This application is a continuation of U.S. application Ser. No. 13/690,704, filed Nov. 30, 2012, which a continuation of U.S. application Ser. No. 13/181,740, now U.S. Pat. No. 8,412,236, filed Jul. 13, 2011, which is a continuation of U.S. application Ser. No. 12/835,950, now U.S. Pat. No. 8,010,132, filed Jul. 14, 2010, which is a continuation of U.S. application Ser. No. 12/420,466, now U.S. Pat. No. 7,783,306, filed Apr. 8, 2009, which is a continuation of U.S. application Ser. No. 10/984,618, now U.S. Pat. No. 7,532,899, filed Nov. 8, 2004, each of which claims the benefit of U.S. Provisional Application 60/562,785, filed Apr. 15, 2004, each of which is entitled "SYSTEM FOR PROVIDING LOCATION-BASED SERVICES IN A WIRELESS NETWORK, SUCH AS LOCATING SETS OF DESIRED LOCATIONS", and each of which is hereby incorporated by reference herein in its entirety.

BACKGROUND

"Here am I?" "Where are you?" "Where is it?" are questions often asked, but not always easily answered. Global positioning system (GPS) and similar location determining devices have allowed users to locate themselves on our planet. Together with mapping software, the GPS network allows users to identify themselves with respect to landmarks, streets, and the like. These and other location determining systems have been used with vehicles (often referred to as "telematics").

Such telematic systems help users identify where their vehicles are with respect to an electronic map to determine directions to a location. A user can input a destination on such telematic systems, and mapping software (often stored in the vehicle with a database of maps) helps determine an appropriate route for the vehicle using an associated GPS device. The mapping software and associated maps may include lists of addresses or points of interest (POI's) to which the system may compute a route.

Fleet tracking systems or automatic vehicle location (AVL) systems allow a central location to track the locations of various vehicles in a fleet, where each vehicle includes an onboard system having wireless circuitry to provide the position of a vehicle in the fleet to the central location. Examples of such systems are provided by, for example, Qualcomm of San Diego, Calif.

Certain services, such as Maps.com, allow users to access a large database of maps and request directions or routes from a starting point to an ending point. If a user has a wireless, Internet-enabled device, such as a wireless palmtop computer, the user may then access such maps and associated directions wirelessly. Still, there is a need for improved location-based services and systems.

BRIEF DESCRIPTION OF THE DRAWINGS

FIG. 13 is a data diagram illustrating a table for use by the system of FIG. 1.

FIG. 14 is a data diagram illustrating a table for categories of a given user-defined set.

Figure 1:
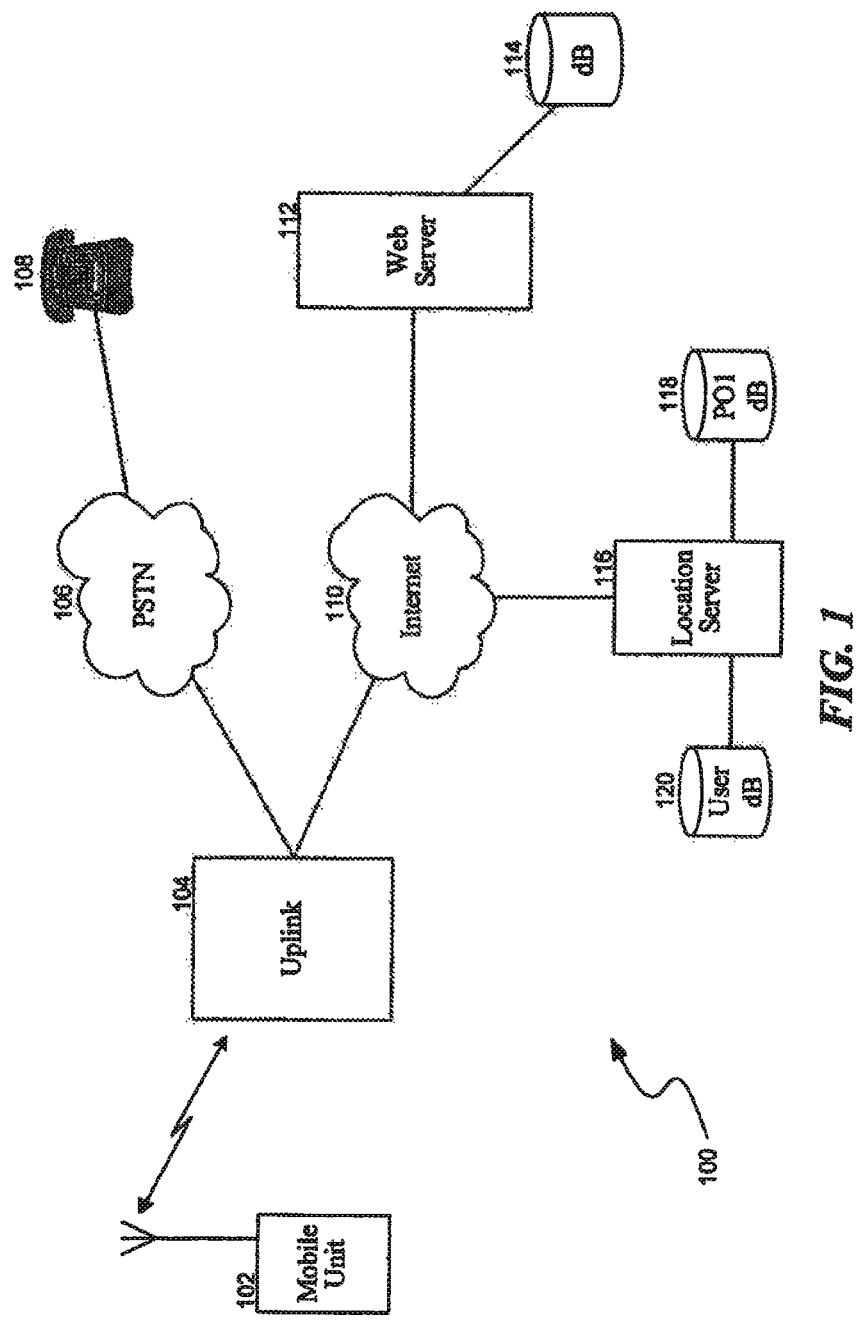
FIG. 1 is a block diagram of a suitable system for employing location-based services under embodiments of the invention.

The headings provided herein are for convenience only and do not necessarily affect the scope or meaning of the claimed invention.

In the drawings, the same reference numbers identify identical or substantially similar elements or acts. To easily identify the discussion of any particular element or act, the most significant digit or digits in a reference number refer to the Figure number in which that element is first introduced (e.g., block 1202 is first introduced and discussed with respect to FIG. 12).

A portion of this disclosure contains material to which a claim for copyright is made. The copyright owner has no objection to the facsimile reproduction by anyone of the patent disclosure (including Figures), as it appears in the United States Patent and Trademark Office patent file or records, but reserves all other copyright rights whatsoever.

DETAILED DESCRIPTION

Described in detail below is a system and associated method that allows users to locate groups or sets of businesses, points of interest (POI's) or other locations, and manage this information in a user-friendly environment. A user with a wireless device, such as a cellular phone, may identify the locations of user-defined sets of locations and receive directions to a desired location. Indeed, aspects of the system allow a user to automatically identify in one action or few steps, the locations of a user-specified set of locations, such as restaurants, coffee shops, convenience stores, etc.

Under a set finding function, sometimes referred to as "My 5 Nearby," a user can establish a set or list of categories of points of interest, and automatically find the nearest listing for each of these points of interest with a single click on a mobile device. The user can create several of these sets and load one at will. For example, a given set may have points of interest including restaurants, automatic teller machines (ATMs), supermarkets, parks, and coffee shops. Then, with a single click or user selection, the system automatically locates the nearest restaurant, ATM, supermarket, park, and coffee shop with respect to the user's current location.

The system uses a location determination method to determine the user's location, searches a database of Points of Interest, and determines the nearest listing in each category in the user-defined set. The database returns the name and/or other information regarding each nearest listing, and provides this information to the user's mobile device. The user can click on a listing to get more detailed information, such as address, phone number (if applicable), and so forth. The user can then also view a list of the next closest points of interest in each category and so on, until there are no more listings in a given area based on a predefined search area or radius. Various other features are described in detail herein.

In a broad sense, embodiments of the invention relate to location-based services in a system for providing wireless telecommunications services to mobile devices. The system can receive a command from a user's mobile device to locate points of interest near the mobile device's location. The points of interest are associated with different, user-identified, point of interest categories. Based at least in part on the mobile device's location, the system substantially simultaneously provides a list of points of interest for at least some of the point of interest categories.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

A representative system to implement functionality described herein will first be described. Thereafter, a representative user interface and location-based functionality is described. Finally, representative data structures and suitable mobile devices are described.

Representative System

Referring to FIG. 1, a system 100 is shown where a wireless device or mobile unit 102 (such as a 2.5 G GPRS-enabled mobile handset) communicates wirelessly to a 2.5 G uplink 104. A typical 2.5 G uplink 104 includes multiple components not shown, such as (in order), a base transceiver station (BTS), a base station controller (BSC), and in a General Packet Radio Service (GPRS), a Gateway Serving GPRS Support Node (SGSN), a GPRS wide area network (WAN), a Gateway GPRS Support Node (GGSN), a wireless access protocol (WAP) gateway, and other components known by those skilled in the relevant art. Further details regarding a suitable system for implementing functionality described herein may be found in commonly assigned U.S. patent application Ser. No. 10/324,984, now U.S. Pat. No. 7,203,502, filed Dec. 20, 2002, entitled, "System For Providing Location-Based Services In A Wireless Network, Such As Locating Individuals And Coordinating Meetings". Of course, while a 2.5 G network and wireless device are shown, embodiments of the invention may be used in various other wireless systems.

Through the uplink 104 and public switched telephone network 106 the mobile unit 102 may communicate with a landline phone 108, using known means. Likewise, the mobile unit can access a data network, such as the Internet 110 to access content provided by a web server 112 from a database 114. While two separate networks 106 and 110 are shown, a single network may be provided, or more than two networks provided to the mobile unit 102. Further, the mobile unit 102 may access numerous other services and systems via the system 100.

A location server 116 provides much of the functionality described below. While shown as a single computer, the location server 116 may in fact be two or more computers or data processing platforms configured to provide the functionality described herein. The location server 116 communicates with a location database 110 that provides information regarding points of interest, maps, and the like. Likewise, the location server 116 communicates with a user database 120 that stores tables (described below) regarding user preferences, and other user-specific data, often linked to the user's mobile unit 102.

While a mobile unit or phone is shown in FIG. 1, those skilled in the relevant art will appreciate that the invention can be practiced with other devices and configurations, including Internet appliances, hand-held devices, wearable computers, multi-processor systems, microprocessor-based or programmable consumer electronics, set-top boxes, network PCs, mini-computers, mainframe computers and the like. The invention can be embodied in a special purpose computer or data processor that is specifically programmed, configured or constructed to perform one or more of the computer-executable instructions explained in detail below. Indeed, the term "computer" or "wireless device," as used generally herein, refers to any of the above devices and systems, as well as any data processor.

The system 100 performs a routine, described below, that permits a user or subscriber to define one or more types of locations so that the user can automatically obtain information, such as locations, for a set of such location types. The routine is described below as being executed by the location server 116 (or related components), which provides display pages or menus to the mobile unit 102, although much of the functionality could be moved to the mobile unit. (The terms "mobile unit," "mobile device," and similar terms, are often used interchangeably herein.) The routine may be implemented as computer-executable instructions, such as routines executed by a general-purpose computer (e.g., a server or personal computer). Such instructions may be stored or distributed on computer-readable media, including magnetic and optically readable and removable computer disks, hard-wired or preprogrammed in chips (e.g., EEPROM semiconductor chips or ASICs), as well as distributed electronically over the Internet or over other networks (including wireless networks). Those skilled in the relevant art will recognize that portions of some embodiments of the invention may reside on a server computer, while corresponding portions may reside on a client computer or wireless device. Data structures and transmission of data particular to aspects of the invention are also encompassed within the scope of the invention. In general, while specific hardware platforms, such as the system 100, are described herein, aspects of the invention are equally applicable to nodes on a network having corresponding resource locators or addresses to identify such nodes for data routing and requesting execution of commands.

The terms "user" and "subscriber" are used interchangeably, and refer to a given individual employing or otherwise affected by functionality or systems described herein. A "subscriber" need not necessarily be one who subscribes to the location-based services described herein. With respect to system functionality, the terms "user," "subscriber," and the like are logically equivalent, and represent any data that the system uses to identify and manage wireless devices and provide location information. The invention may be used for providing location-based services with respect to one or more wireless devices in a group or nodes in any network, as well as with respect to POIs.

Representative User Interface and Functionality

Representative user interface screens for displaying information to users, with associated logic branching and functionality, will now be discussed with respect to FIGS. 2 through 12. Indeed, FIGS. 2-12, and their associated descriptions, describe a routine for implementing the functionality described herein. These Figures include examples of information displayed to a user ("display pages"), and examples of choices selected by the user. Those skilled in the relevant art will readily recognize that other examples are possible. Likewise, FIGS. 2 through 12 are generally self-explanatory to one skilled in the relevant art (based on the detailed description provided herein). Aspects of some initial user displays and functionality will be described in detail, but subsequent displays and functionality may be described in less detail. Those skilled in relevant art will recognize that subsequently discussed displays and functionality have much of the same details as those described previously. While the following discussion describes providing information to the user, the server 116 or portal actually provides, via the uplink 104, a display page for display on the wireless device or mobile unit 102 or other communication to the user.

The display pages may be implemented in WAP, XML (Extensible Markup Language), HTML (Hypertext Markup Language), Handheld Device Markup Language (HDML), Wireless Markup Language (WML), or other language or scripts that provide information to a user. The display pages provide facilities to receive user input data, such as fields to be filled in, one or more numbered items to be selected from menus, hypertext links to select, displays allowing one or more of several options to be selected, or other known user interface tools for receiving user input. Of course, while one or more ways of displaying information to, and receiving input from, users in pages are shown and described herein, those skilled in the relevant art will recognize that various other alternatives may be employed. The terms "screen," "display page" and "page" are generally used interchangeably herein.

The display pages are stored as display descriptions, graphical user interfaces, or as other methods of depicting information on a computer screen (e.g., commands, links, fonts, colors, layout, sizes and relative positions, and the like), where the layout and information or content to be displayed on the page is stored in the database 124 (or other location). In general, a "link" refers to any resource locator identifying a resource on a network, such as a display description provided by an organization having a site or node on the network. A "display description," as generally used herein, refers to any method of automatically displaying information on a display screen in any of the above-noted formats, as well as other formats, such as email or character/code-based formats, algorithm-based formats (e.g., vector generated), or matrix or bit-mapped formats.

Figure 2:
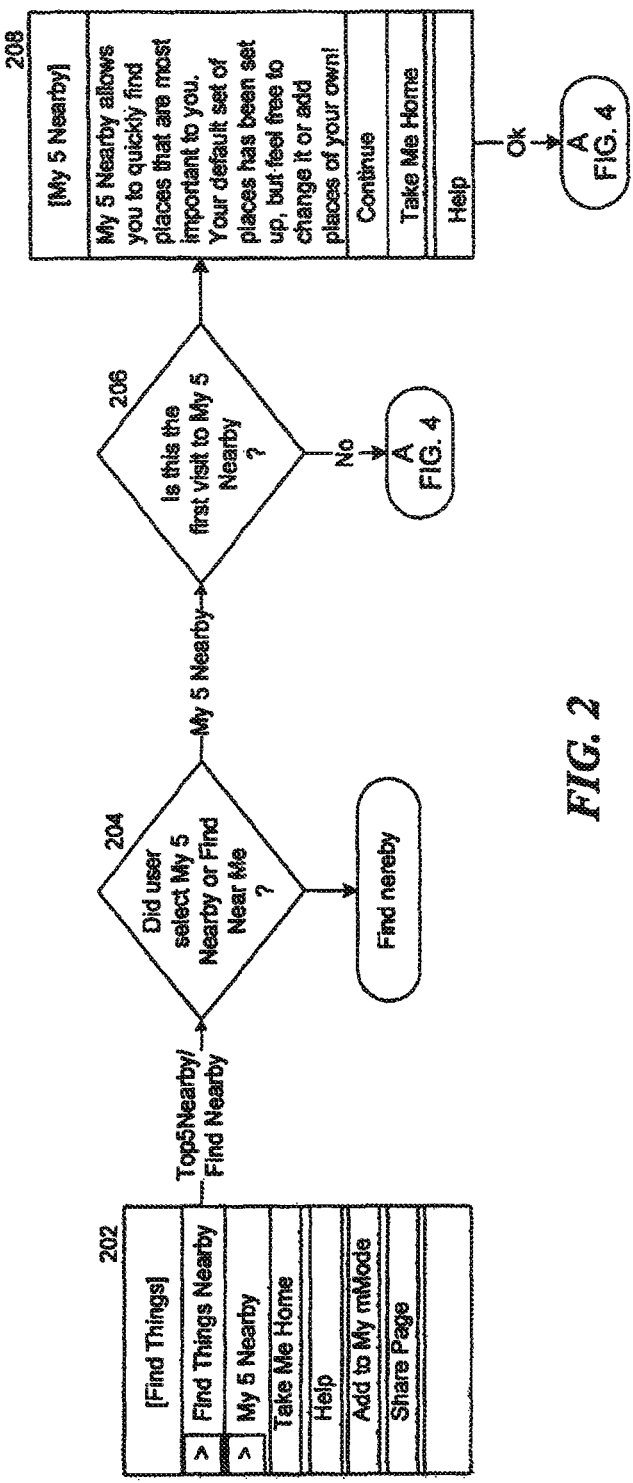
FIGS. 2 through 12 are user interface flow diagrams for allowing a user of the system of FIG. 1 to locate sets of desired locations.

Referring to FIG. 2, the server 116 provides an initial Find Things Menu to the user under block 1202. As shown, the Find Things Menu provides the user with six options: (1) Find Things Nearby, (2) My 5 Nearby, (3) Take Me Home, (4) Help, (5) Add To My mMode, and (6) Share Page. The Find Things Menu provides the starting place, and initial branching, for options and functions provided to the user.

Many display screens shown in the FIGS. 2 through 12 include similar options such as "Help," "OK," and "Take Me Home". Selecting the "Help" option displays for the user one or more screens for aiding the user or answering questions the user may have. Selecting the "OK" option selects a given choice or command displayed on the screen. Selecting the "Take Me Home" option returns the user to the Find Things Menu, or to a main menu screen for providing various other functions (not shown). Selecting the "Add To My mMode" option allows the user to bookmark a given page for ready access later, while selecting the "Share Page" option allows the user to provide a given page or screen to another user. Details regarding the Share Page option may be found in the commonly assigned U.S. patent application Ser. No. 10/821,608 filed Apr. 9, 2004, entitled "Sharing Content On Mobile Devices."

Many display screens shown in the FIGS. 2-12, and other functionality described herein, provide specific, suitable values for certain parameters. Those skilled in the relevant art will readily recognize that system may employ other values. For example, while the system 100 is indicated above as being able to locate five locations at a time, an alternative system may locate only 3 locations at a time, or may be capable of locating 10 or more simultaneously. Thus, such specific numbers or values provided herein are only examples, and many other values may be employed.

If the user selected either the "Find Things Nearby" or "My 5 Nearby" then in block 204, the system 100 determines which of these two options the user selected. If the user selected the "Find Things Nearby" option, then the routine branches to provide specific options to allow the user to locate a specific thing nearby. Further details regarding this option may be found in the above-referenced U.S. patent application bearing application Ser. No. 10/324,984, now U.S. Pat. No. 7,203,502. If the user did not select this option, then in block 206, the system determines whether this is the first time the user has selected the "My 5 Nearby" option. If so, then in block 208, the system displays to the user an introduction page. After selecting a "continue" option, or if this is not a new user, then the routine branches block 402 shown in FIG. 4.

Figure 4:
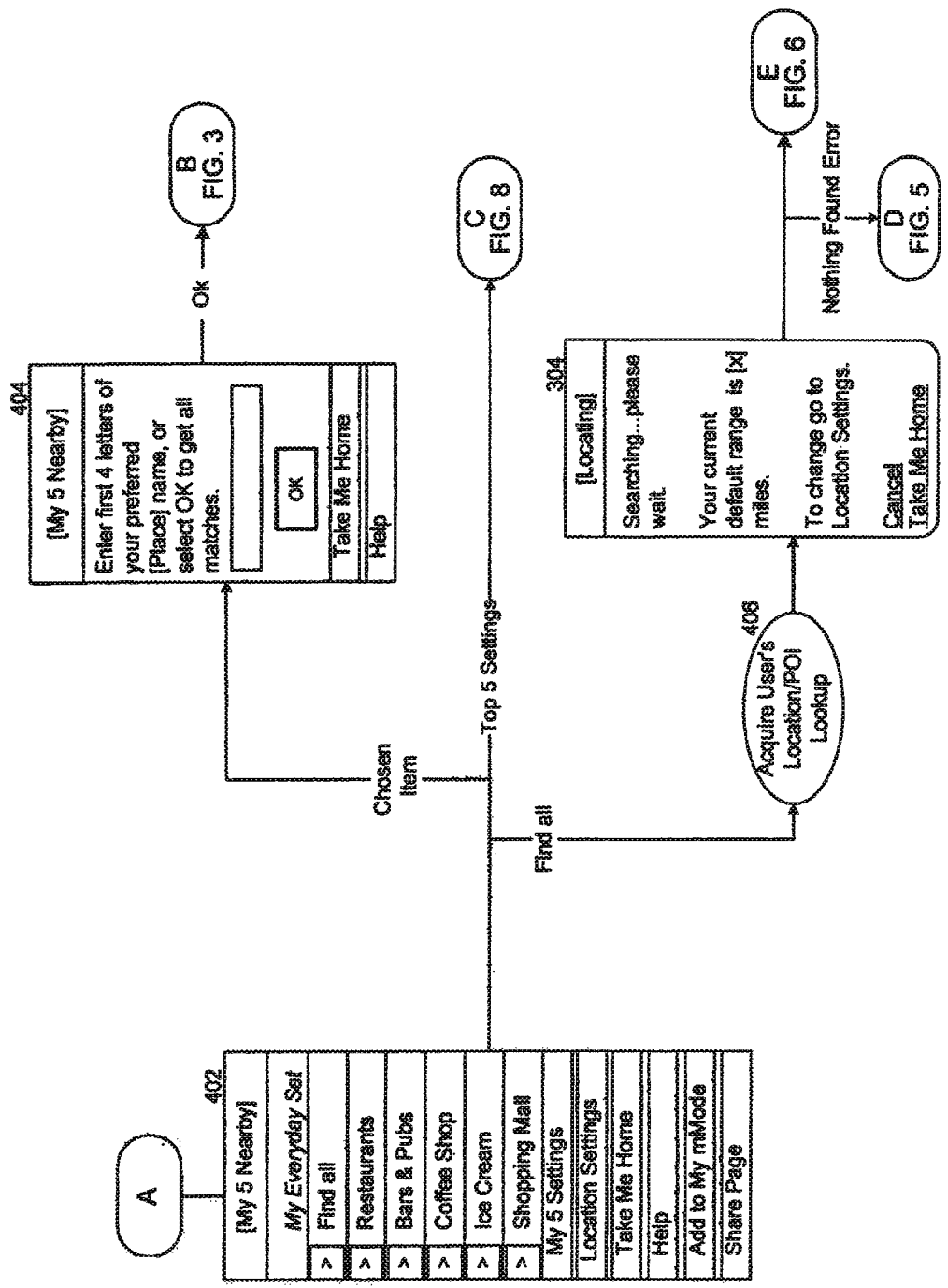
Figure 5:
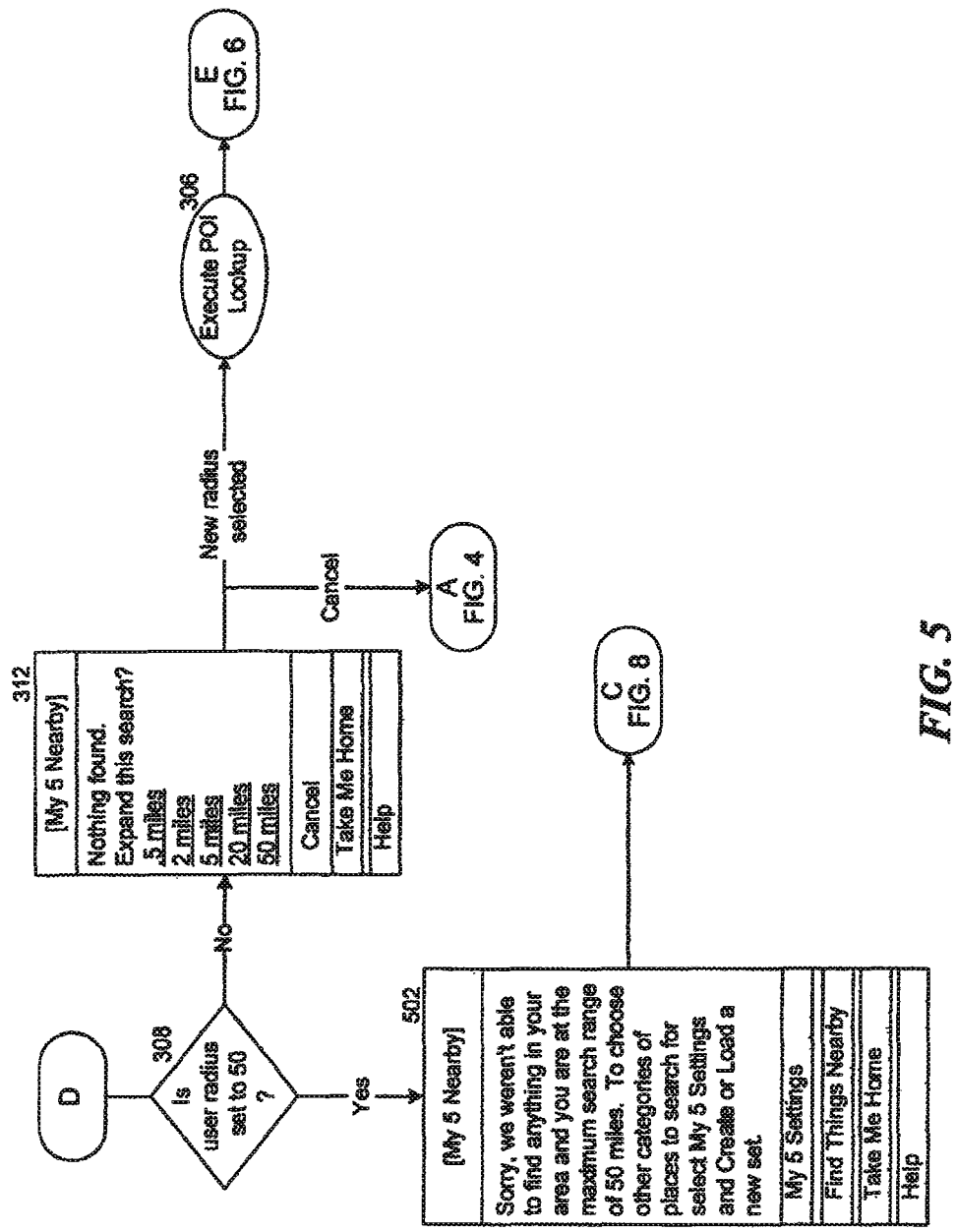
Figure 6:
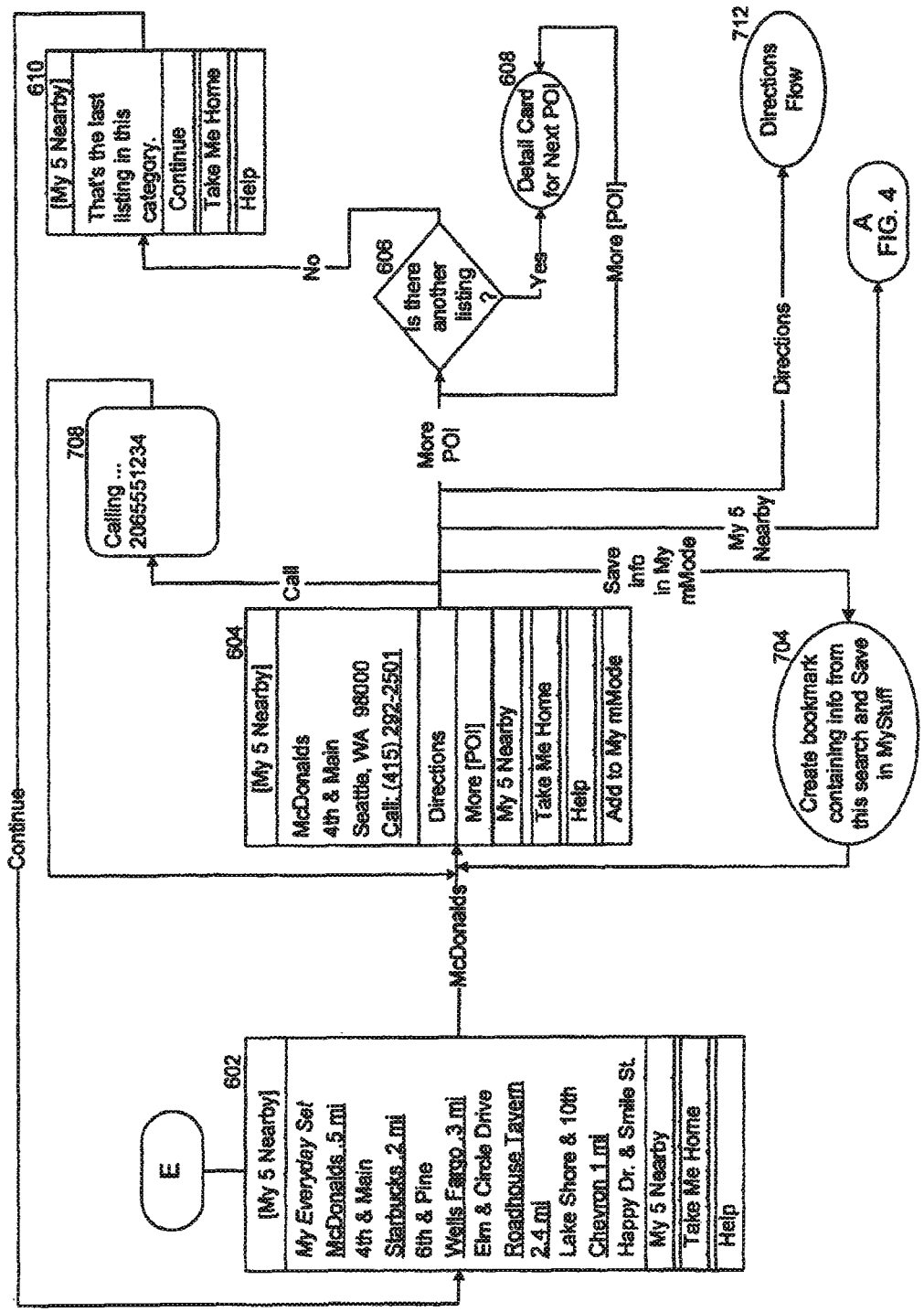
Figure 7:
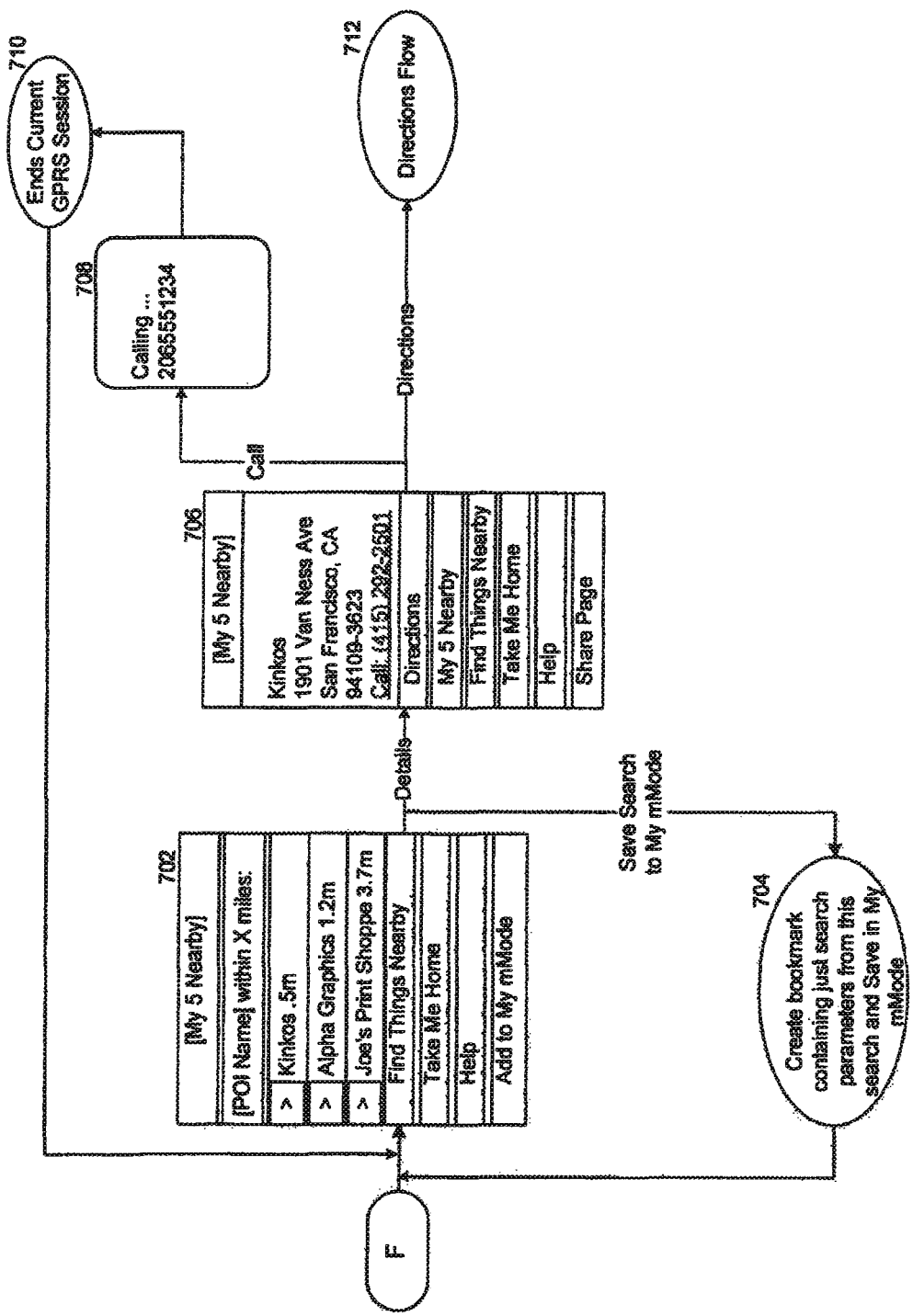

Referring to FIG. 4 in block 402, the routine displays a main My 5 Nearby menu. As shown, a My Everyday Set menu is listed that includes options of: Find All, Restaurants, Bars & Pubs, Coffee Shop, Ice Cream, and Printer. Also displayed are options for My 5 Settings, Location Settings, Take Me Home, Help, Add To My mMode, and Share Page.

Figure 3:
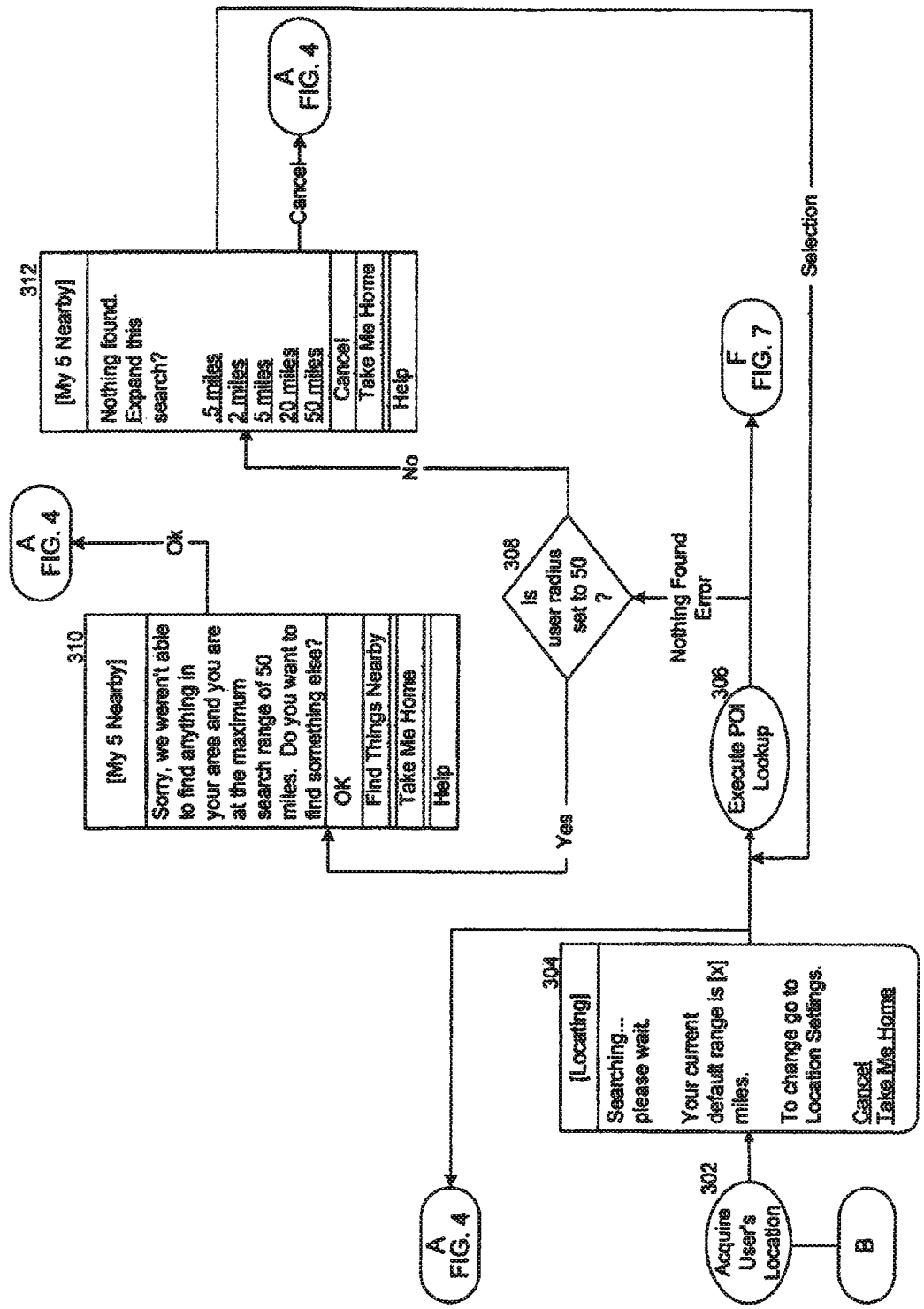

If the user selects one of the listed point of interest (POI) categories, such as Printer, then in block 404, the user may enter the first four letters of a preferred place name to find the nearest location of that place, or simply click OK. In this example, by clicking OK, the system, in FIG. 3, acquires the user's location under block 302 and displays a screen shown in block 304 that indicates to the user that the system is searching and that the user's current default range is [X] miles. In block 306, the system executes a point of interest lookup by analyzing the location database 118. If nothing is found, then the system in decision block 308 determines if the user's radius is set to a maximum value, such as 50 miles. If so, then in block 310, the system displays a screen indicating that the maximum range is set and nothing was located, while providing a series of subsequent options. If the maximum radius is not set, then in block 312, the system displays to the user different search radii to permit the user to expand the search radius. As shown in FIG. 3, and in the other figures, by clicking Cancel or OK, as the case may be, the user may return back to the My 5 Nearby menu shown in block 402 of FIG. 4.

Assuming that the POI lookup does identify one or more POIs in the user's selected category, then the system displays to the user the found POIs. An example of this is shown in block 702 of FIG. 7, with three separate printers listed with estimated distances to each. The user may select a Add To My mMode option to create a bookmark or other saved record, so that the user may readily obtain the search parameters again (block 704). By selecting one of the retrieved and displayed POIs, such as "Kinko's," the system retrieves from the POI database 118 details regarding the selected location, such as an address and phone number, as shown in block 706. The user may click on the depicted phone number to call the location (block 708), and the system ends the current data session under block 710. Alternatively, the user may select a directions option to obtain directions for the location in block 712. The directions may be one or more screens of text providing stepby-step directions from the user's current location to the selected POI, a map, or both.

Figure 8:
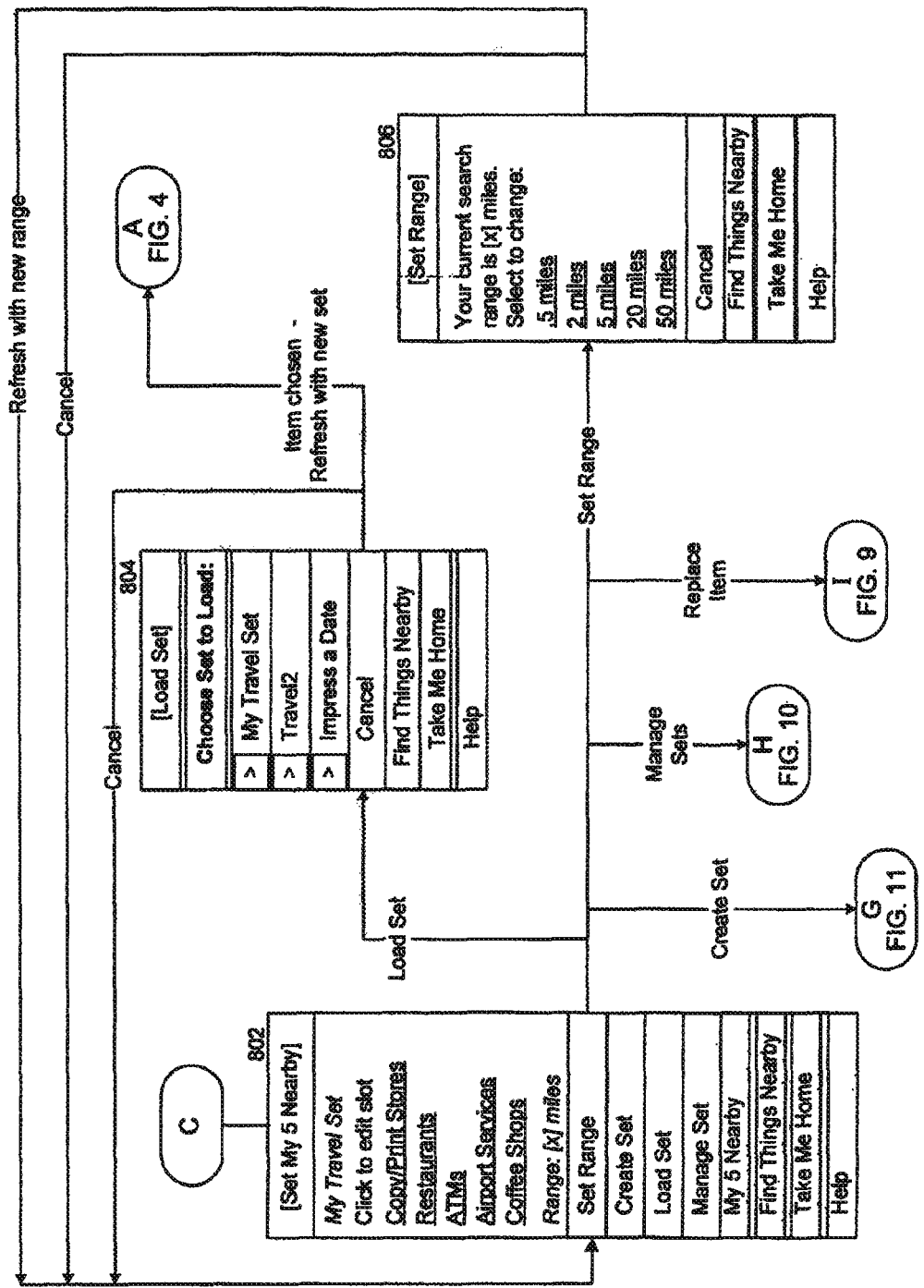

Referring back to FIG. 4, if the user selects a my settings, then the system displays one of the user's previously established POI sets. As shown in FIG. 8, a My Travel Set is shown, although the system could display the previously displayed set, namely the My Everyday Set shown in FIG. 4.

Under block 802 of FIG. 8, the user may select a Load Set menu option to display under block 804 all sets the user previously created. As shown, the user has created not only the My Travel Set, but also Travel 2 and Impress a Date sets. By selecting one of the sets shown in block 804, the system refreshes the mobile phone with the new set and its associated and predefined POIs, and returns back to block 402. The user may select a Set Range option under block 802, and in block 806, change the default range, as noted above under block 312.

Figure 9:
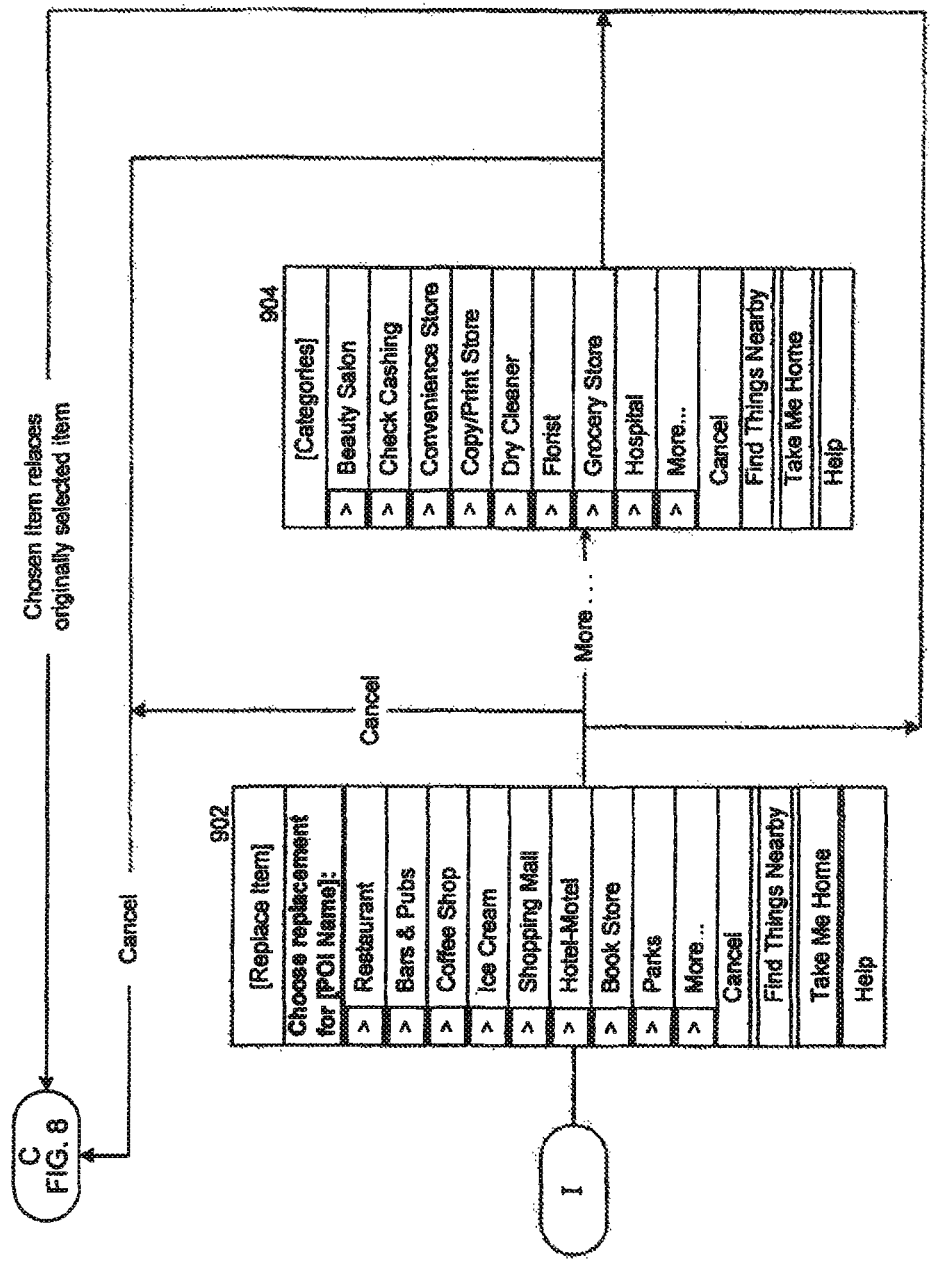

By clicking on one of the listed POIs in block 802, the user can replace that POI with another POI category. As shown in FIG. 9, the system displays a list of replacement POIs in block 902. By simply selecting one of these, the user readily replaces an existing POI category with another in the user's set (which was previously selected and shown under block 802). By selecting a More option, an additional set of POIs is displayed, such as that shown in block 904. The POI categories listed in block 902 are those that typically are more popular. The categories listed in block 904, and other blocks (not shown) list categories alphabetically. Of course, even more POIs may be provided to the user, depending upon limits of data in the POI database 118. Other examples of points of interest include pharmacies, hospitals, fire/police department locations, and other emergency-type locations. (In general, a point of interest may be any physical or geographic location.) The system typically provides a list of common types of meeting places, as those described herein. The meeting places are associated with a location or location context. The location context need not be an exact street location, but a general area, such as city, state, neighborhood, site (e.g., cell site).

The system may of course find any type of location to satisfy user needs, such as automotive services (e.g., gas stations, tow services, automotive repair locations, auto dealerships, etc.), financial institutions (e.g., banks, automatic teller machines (ATMs), check cashing locations, etc.), governmental locations (e.g., libraries, post offices, vehicle/license registration locations, police stations, fire departments, etc.), travel services (e.g., taxi services, hotels/motels, train stations, etc.), and general consumer services (e.g., Laundromats, dry cleaners, grocery stores, convenience stores, newsstands, health clubs, shopping malls, copy/print stores, etc.).

Each of the categories may be further subdivided. For example, the system may provide not only a generic category of "restaurants," but also subcategories, such as "fast food restaurants," "Mexican restaurants," "Japanese restaurants," and so forth. Other categories noted above may be further subdivided, to thus provide the user with further granularity in identifying desired locations or points of interest. The number and type of categories are limited by the number and type of fields or other record designators for POIs in the location database.

Figure 10:
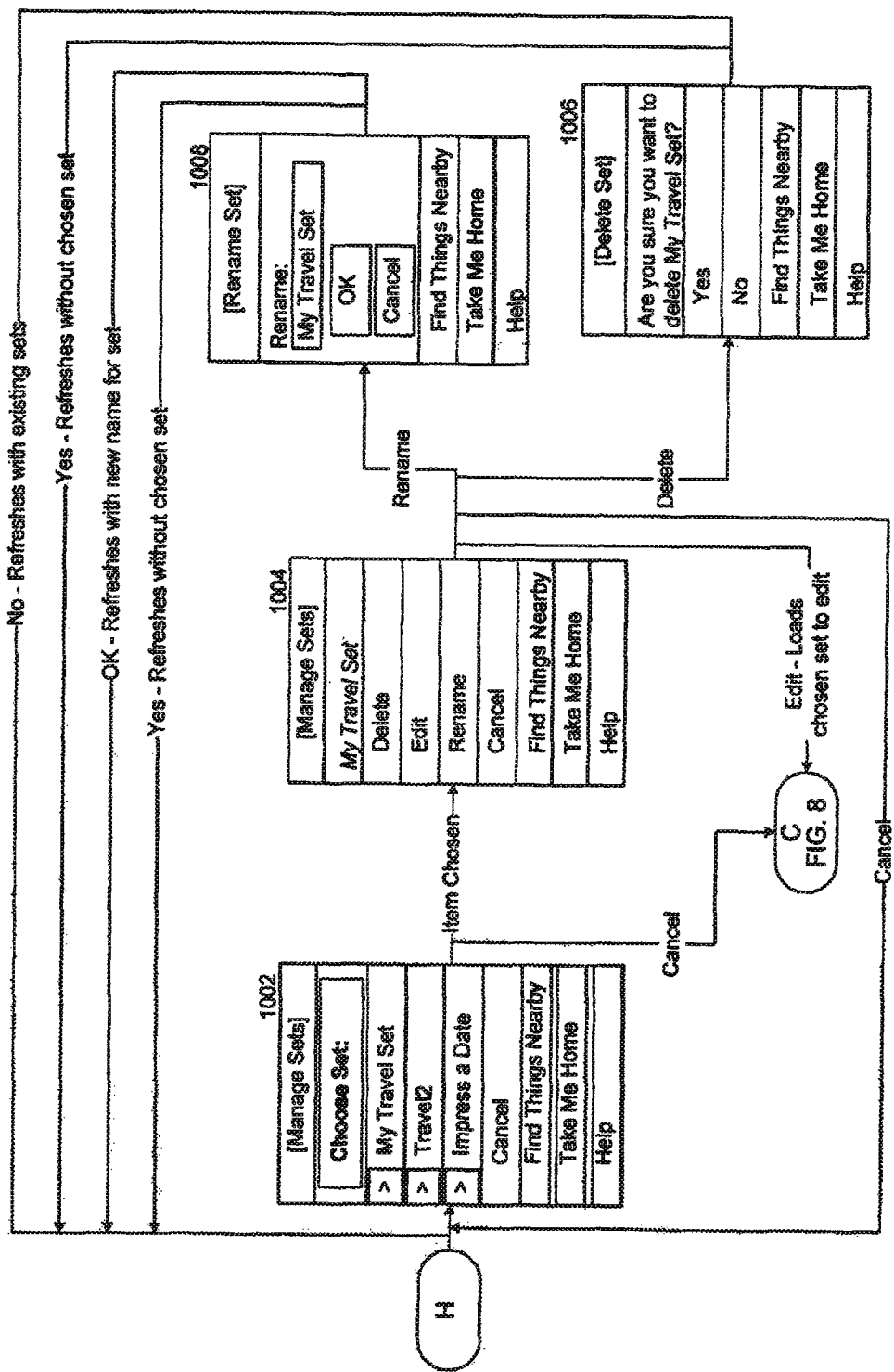

If the user selects a Manage Sets option under block 802, then the system provides a list of the user's previously defined sets under block 1002 of FIG. 10. By selecting one of the sets, such as the My Travel Set, then in block 1004, the system provides the user with several options. By selecting a Delete option, then in block 1006, the system confirms whether the user wishes to delete the selected set. By selecting a Rename option, then in block 1008, the system displays to the user the current name of the set in an edit box to allow the user to rename the set. If the user selects an edit option, then the selected set is displayed in block 802 of FIG. 8.

Figure 11:
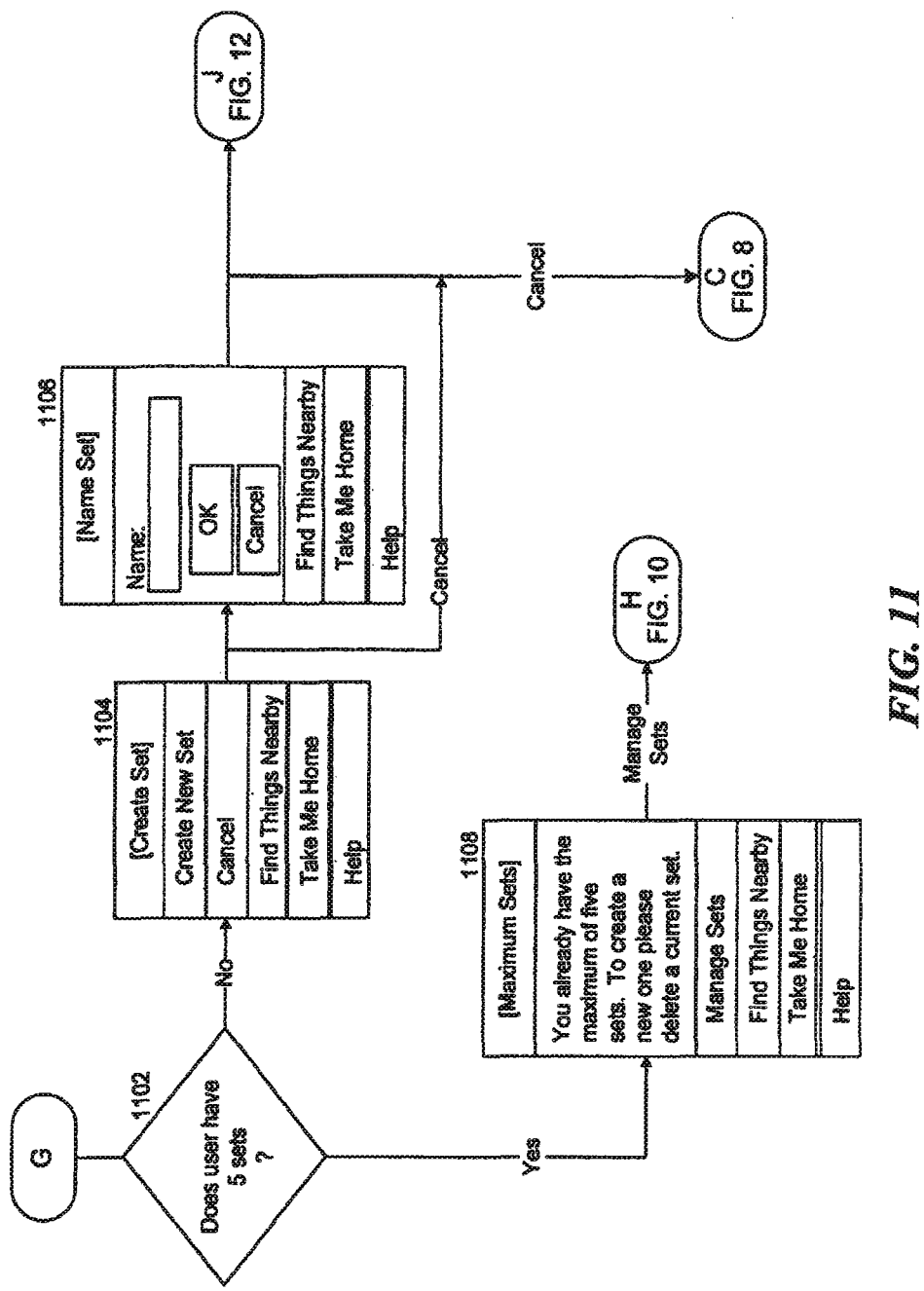

If the user selects a Create Set option under block 802, then the system determines in decision block 1102 of FIG. 11 whether the user has already defined a maximum number of sets, such as 5. If not, then in block 1104, the system displays to the user the option to create a new set, and under block 1106 allows the user to name the new set. However, if the user has already defined a maximum number of sets, then in block 1108, the system provides such an indication to the user. The user may then manage the predefined sets and loop back to block 1002 of FIG. 10.

Figure 12:
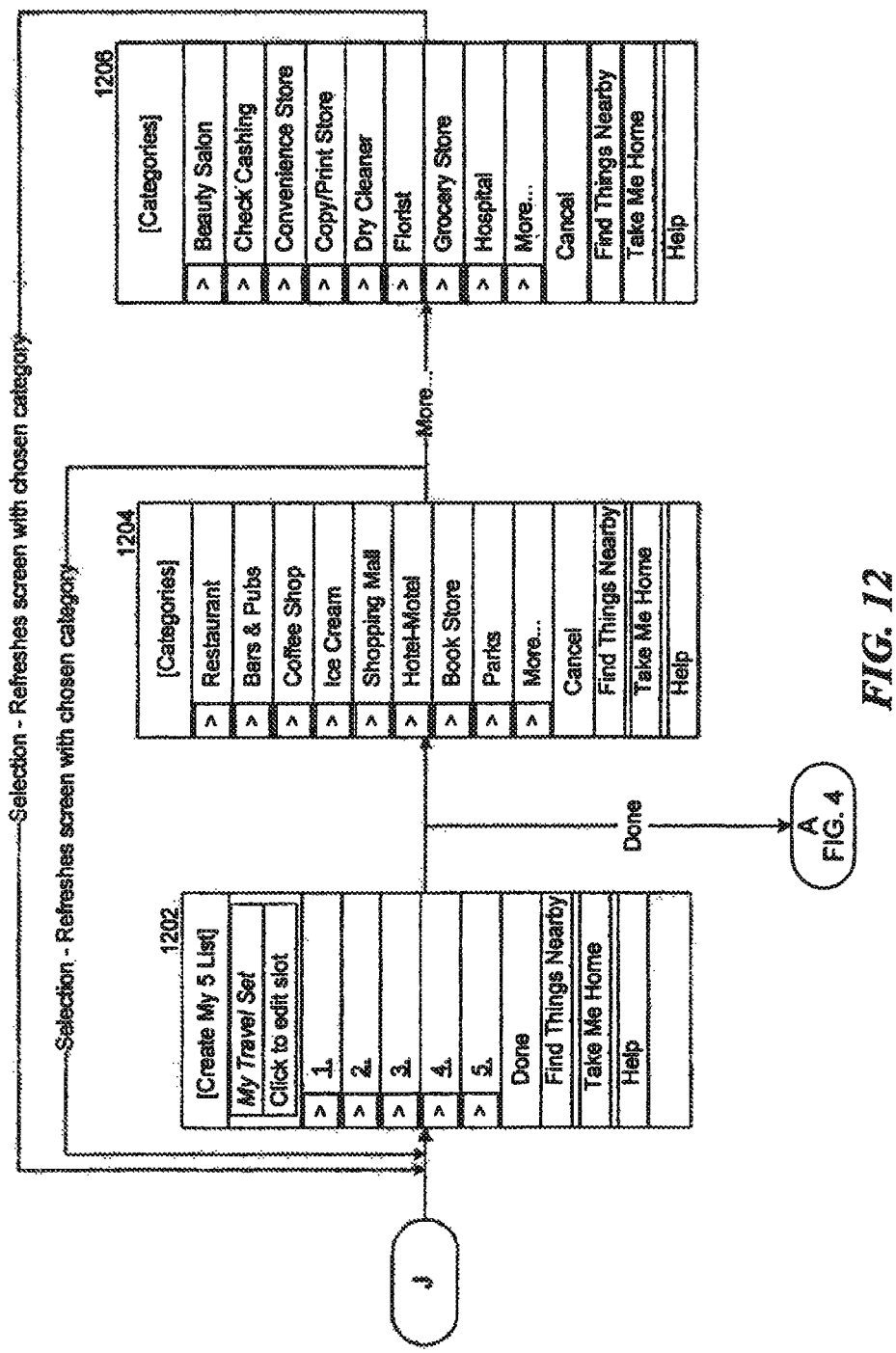

If the user defines a new set under block 1106, then in block 1202 of FIG. 12, the system provides to the user a screen of empty POI category slots. The user may click on one of these slots, and the system in turn displays a list of categories under block 1204 and 1206, in a manner similar to that of FIG. 9. In this way, the user may define a new POI set.

Referring back to FIG. 4, if the user selects a Find All option under block 402, then in block 406 the system acquires the user's location and performs a POI lookup in the database 118 to identify the nearest POI for each of the POI categories defined in the selected and displayed POI set. If nothing is found, then in block 502 of FIG. 5, the system displays to the user an error message and provides additional options. However, if one or more POIs in the categories are found, then in block 602 of FIG. 6, the system displays to the user the nearest POI in each category. By selecting one of the depicted POIs, then in block 604 the system displays details regarding the POI in a manner similar to that under block 706, described above. By selecting a More [POI] option under block 604, the user may request the system to provide additional POIs beyond the single nearest one obtained. As a result, the system under decision block 606 determines whether there are additional listings, and if so, obtains from the database 118 under block 608 the next POIs, or set of POIs, and displays it, or them, in a screen similar to 604 or 602, respectively. The user can continue to select the next nearest location or set of locations. If no additional listings exist, then in block 610 the system indicates to the user that the last listing in the POI category has been found.

Representative Data Structures And Mobile Units

An example of a table, record or other data structure stored in the user database 120 to assist in providing the above functionality will now be described. Referring to FIG. 13, a record 1300 lists a user's POI set, which in the example above is limited to five sets per user. A user-specified alphanumeric string or title defines or identifies each set. Each defined set then relates to a series of categories. Referring to FIG. 14, a record 1400 shows five categories that relate to one of the POI sets in the record 1300, namely set 1. Under the record 1400, the user identifies between one and five categories of POIs previously defined by the system.

While the terms "field" and "record" are used herein, any type of data structure can be employed. For example, relevant data can have preceding headers, or other overhead data preceding (or following) the relevant data. Alternatively, relevant data can avoid the use of any overhead data, such as headers, and simply be recognized by a certain byte or series of bytes within a serial data stream. Any number of data structures and types can be employed herein.

Figure 15:
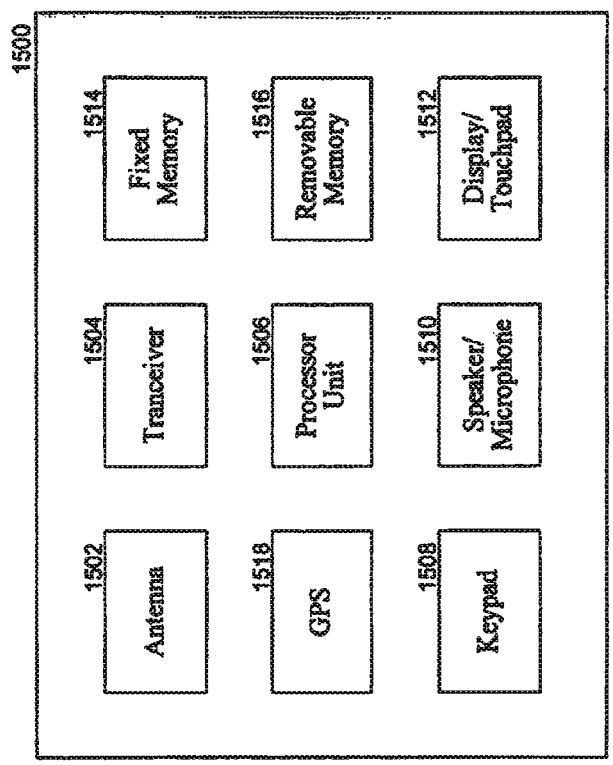
FIG. 15 is a block diagram of a suitable mobile device.

FIG. 15 shows a block diagram of a typical mobile communication device 1500 such as a mobile station, wireless device, or the mobile unit 102. The mobile unit 1500 has one or more internal or external antennas 1502 for receiving and transmitting electromagnetic signals such as radio frequency signals. A transceiver 1504 is connected to the antenna 1502 and typically provides modulation and demodulation of the transmitted and received signals, respectively. One or more processor units 1506 connected to the transceiver 1504 may comprise a signal processor, microprocessor, ASIC, or other control and processing logic circuitry. The processor unit 1506 may perform signal coding, data processing, input/output processing, power control, and other functions necessary for implementing a mobile communication device.

A user may provide input to the processor unit 1506 via a keypad 1508, speaker/microphone 1510, or display/touchpad 1512. In turn, the processor 1508 may provide information to the user via the display/touchpad 1512 or speaker/microphone 1510. Additionally, the processor 1506 may access information from, and store information in, a fixed memory 1514 or a removable memory 1516. The fixed memory 1512 may consist of RAM, ROM, a hard disk, or other well-known memory storage technologies. The removable memory 1516 may consist of Subscriber Identity Module (SIM) cards that are well known in GSM communication systems or other well-known memory storage technologies. The mobile communication device 1500 may also include an optional GPS or other locational chipset or receiver 1518 that provides latitude and longitude information about the mobile device's 1500 current location.

In some embodiments of the invention, the mobile device 1500 could store POI set information in the removable memory 1514 or non-removable memory 1512. Such information could include, for example, the list of POI categories or other data noted above (e.g., search radius range). Indeed, any of the information data structures or records described above may be stored in the removable memory 1514. Upon receiving a command from an input device, such as a keystroke on the keypad 1508, the processor unit 1506 would retrieve or store POI set information from/to the removable memory 1514 or non-removable memory 1512.

If the mobile device 1500 is equipped with the GPS receiver 1518, the device may provide to the system latitude and longitude information about the mobile device's current location with a find request. The system may then skip certain steps (e.g., block 302) and proceed directly to querying the POI database 118.

Many alternatives are possible. For example, a dedicated button or switch may be provided on the mobile device 1500 to permit the user to readily perform one or more functions described above, such as locating all POI categories in a set.

CONCLUSION

A service provider providing the functionality described above may derive revenue based on kilobyte traffic or usage. For example, each message sent, or corresponding reply, may generate revenue based on system usage. Alternatively, or additionally, the service provider may provide such functionality on a subscription basis. The service provider may provide premium content or features to users at rates higher than simple subscription fees for a data plan. For example, a user may identify five location types, while a user with premium services may provide many more.

Alternatively, or additionally, a service provider providing the functionality described above may derive revenue by billing content providers for responding to certain user location requests. For example, if a user requests the system to identify the closest McDonalds™, or other name brand retailer, the system may then bill the corresponding retailer for providing such information to the user. Likewise, the user may request the location of the nearest retailer offering a particular deal (e.g., a sale on a particular article), and the service provider then receive a fee from the merchant for providing the information, or even a fraction of any sale consummated with the user.

The service provider may also obtain revenue on a per use basis. For example, each time the user performs a search (e.g., to find the nearest brand name fast food restaurants), the user may be charged a flat fee. Other fee generating examples may include the user requesting a graphical map of locations or directions, results of a traffic query, etc. Certain businesses could pay to have their locations listed first (or only listed) if they were sufficiently close to a user's location. Further, certain businesses may have specific locator applications. For example, a given fast food restaurant could allow the user to readily locate the nearest location of that restaurant.

Under another alternative, the system can provide richer information than simply a location, phone number and directions for the POI. For example, the system may provide a small graphic or image of the retrieved POI, provide a short video, animation, advertisement or other audiovisual presentation to the user regarding a retrieved location. Many other options are, of course, possible.

As noted above, users can save search requests. Further, if a user wishes to frequently save certain retrieved items, he or she may do so. For example, if a user performs a search and identifies an interesting or compelling restaurant, the user can save the information regarding that restaurant for later retrieval.

POIs retrieved and displayed to a user are often displayed in increasing order of distance from the user. However, they could be sorted in other ways, such as alphabetically, based on a fee paid by a given business, and so forth. Once a set is loaded, it becomes the default set to be displayed to the user each time. Alternatively, the user can establish a default set that is always returned to when the user powers off the mobile unit, and then powers it back on.

Under an alternate embodiment, the user may establish sublists of locations (similar to subfolders). Thus, the user can establish hierarchical location lists that include certain upper level groupings (e.g., "travel"), with individual location sets provided in one or more of these upper level groupings. The user may thus manage lists in a manner similar to that with respect to files and folders under the Windows and other PC operating systems.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number respectively.

The teachings of the invention provided herein can be applied to other systems, not necessarily the system described herein. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the wireless location system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed is:

1. A method for providing location-based information on a mobile device, comprising:
   obtaining, by the mobile device, a point of interest category selected by a user from a plurality of point of interest categories, wherein the user selection of the point of interest category causes a current location of the mobile device to be acquired;
   providing, from the mobile device, a request to identify points of interest corresponding to the point of interest category near the acquired current location of the mobile device by performing a point-of-interest lookup based on the acquired current location of the mobile device, wherein the request comprises a plurality of characters for identifying the points of interest;
   receiving, by the mobile device, a name of a point of interest, wherein: the name comprises a first portion; and the first portion comprises the plurality of characters; and
   receiving, by the mobile device, point of interest data associated with the point of interest.

2. The method of claim 1, wherein the plurality of characters comprises alphanumeric characters.

3. The method of claim 1, further comprising:
   receiving an indication that there are no points of interest having the name comprising the first portion within a first geographical radius about the current location of the mobile device;
   providing a second geographical radius about the current location of the mobile device;
   receiving the point of interest that is within the second geographical radius.

4. The method of claim 3, wherein the first geographical radius is not equal to a maximum geographical radius.

5. The method of claim 3, wherein the second geographical radius comprises at least one user-selectable geographical radius.

6. The method of claim 1, wherein the plurality of characters comprises four letters included in the name of the point of interest.

7. The method of claim 1, wherein the point of interest data comprises a phone number that, when selected, causes the mobile device to initiate a telephone call to the phone number.

8. A mobile device comprising:
   a processor; and
   memory coupled to the processor, the memory comprising executable instructions that when executed by the processor cause the processor to effectuate operations comprising:
   obtaining a point of interest category selected by a user from a plurality of point of interest categories, wherein the user selection of the point of interest category causes a current location of the mobile device to be acquired;
   providing a request to identify points of interest corresponding to the point of interest category near the acquired current location of the mobile device by performing a point-of-interest lookup based on the acquired current location of the mobile device, wherein the request comprises a plurality of characters for identifying the points of interest;
   receiving, by the mobile device, a name of a point of interest, wherein: the name comprises a first portion; and the first portion comprises the plurality of characters; and
   receiving point of interest data associated with the point of interest.

9. The mobile device of claim 8, wherein the plurality of characters comprises alphanumeric characters.

10. The mobile device of claim 8, further comprising:
receiving an indication that there are no points of interest having the name comprising the first portion within a first geographical radius about the current location of the mobile device;
providing a second geographical radius about the current location of the mobile device;
receiving the point of interest that is within the second geographical radius.

11. The mobile device of claim 10, wherein the first geographical radius is not equal to a maximum geographical radius.

12. The mobile device of claim 10, wherein the second geographical radius comprises at least one user-selectable geographical radius.

13. The mobile device of claim 8, wherein the plurality of characters comprises four letters included in the name of the point of interest.

14. The mobile device of claim 8, wherein the point of interest data comprises a phone number that, when selected, causes the mobile device to initiate a telephone call to the phone number.

15. A computer-readable medium that is not a propagating signal, the computer-readable medium comprising executable instructions that when executed by a processor cause the processor to effectuate operations comprising:
obtaining, by the mobile device, a point of interest category selected by a user from a plurality of point of interest categories, wherein the user selection of the point of interest category causes a current location of the mobile device to be acquired;
providing, from the mobile device, a request to identify points of interest corresponding to the point of interest category near the acquired current location of the mobile device by performing a point-of-interest lookup based on the acquired current location of the mobile device, wherein the request comprises a plurality of characters for identifying the points of interest;
receiving, by the mobile device, a name of a point of interest, wherein: the name comprises a first portion; and the first portion comprises the plurality of characters; and
receiving, by the mobile device, point of interest data associated with the point of interest.

16. The computer-readable medium of claim 15, wherein the plurality of characters comprises alphanumeric characters.

17. The computer-readable medium of claim 15, further comprising:
receiving an indication that there are no points of interest having the name comprising the first portion within a first geographical radius about the current location of the mobile device;
providing a second geographical radius about the current location of the mobile device;
receiving the point of interest that is within the second geographical radius.

18. The computer-readable medium of claim 17, wherein the first geographical radius is not equal to a maximum geographical radius.

19. The computer-readable medium of claim 17, wherein the second geographical radius comprises at least one user-selectable geographical radius.

20. The computer-readable medium of claim 15, wherein the point of interest data comprises a phone number that, when selected, causes the mobile device to initiate a telephone call to the phone number.

* * * * *